Feb. 11, 1930. H. H. MORETON 1,746,402
DIRIGIBLE HEADLIGHT
Filed Jan. 10, 1928
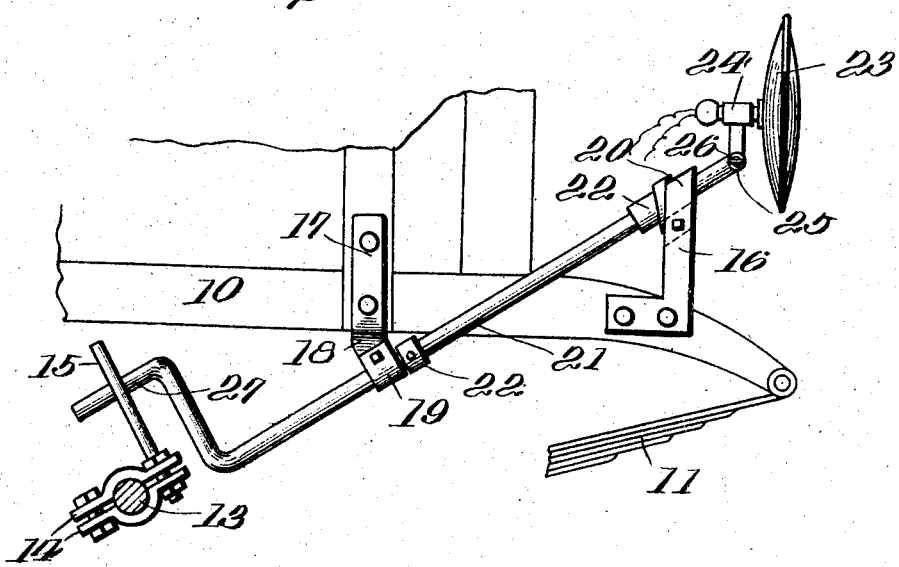
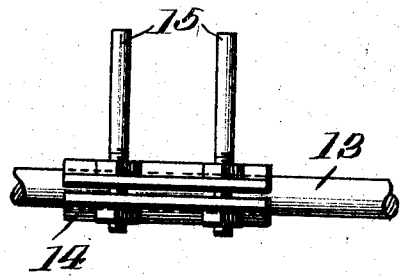
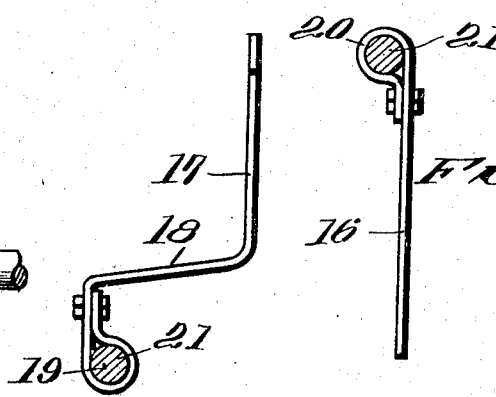
Inventor
Henry H. Moreton
By
Attorney Patented Feb. 11, 1930

1,746,402

UNITED STATES PATENT OFFICE

HENRY H. MORETON, OF STONY POINT, NEW YORK

DIRIGIBLE HEADLIGHT

Application filed January 10, 1928. Serial No. 245,694.

This invention is a light projecting device of the dirigible type, for use on motor or other vehicles.

One of the objects of the invention is to provide a headlight or spotlight lamp having means for movably supporting it, and so arranged that the movements thereof are coordinated with movements of the steering mechanism of the vehicle. A further object is to provide a device of the character mentioned, so arranged that as it moves with the steering mechanism of the vehicle, its beam is not only projected toward the direction to which the vehicle is turning, but is also slightly lifted to increase the range of illumination. A further object is to provide a dirigible light mechanism so constructed that it will assume various positions in conformity to the direction of travel of the vehicle, but having means for preventing the vibrations of the steering mechanism due to rough roads or other causes, from being communicated to the lamp.

The invention will be hereinafter fully set forth and particularly pointed out in the claims.

In the accompanying drawings:—

Figure 1 is a diagrammatic side elevation illustrating a portion of a motor vehicle with the invention applied thereto. Figure 2 is a detail view illustrating the actuating connection between the lamp and the steering mechanism. Figures 3 and 4 are detail views illustrating the bearing brackets for supporting the dirigible device.

Referring to the drawing, 10 designates one of the side bars of the chassis of a motor vehicle, and 11 one of the front springs, said spring connected to the forward end of the side bar 10 and also to the axle 12, in the usual way. The connecting rod between the two steering knuckles of a standard steering mechanism is indicated at 13. The rest of the steering mechanism is not shown, it being understood that the rod 13 is part of the usual construction well understood in the art.

Secured to the connecting rod 13, are spaced apart clamps 14, each of which is provided with a projecting rod 15, said rods being arranged in parallel relation with a small space between them as shown.

Secured to the chassis in suitable manner, is a forward bearing bracket 16, and a rear bearing bracket 17. The bracket 16 is of approximate L-shape in side view and projects above the plane of the side bar 10. The bracket 17 depends below the plane of the side bar 10, and is provided with a slightly offset portion 18 shaped to form a bearing 19, in line with an inclined bearing 20 carried by the bracket 16.

Rotatably mounted in the bearings 19 and 20 is the dirigible shaft 21, suitable stops 22 being provided to limit endwise movement of said shaft. A lamp 23 of any desired form is mounted in the usual form of lamp bracket 24, conventionally shown in Figure 1. Said bracket is pivotally connected to the shaft 21, as indicated at 25, and held in any desired angular adjustment with respect to the axis of the shaft, by means of a thumb nut 26. The lower end of the shaft 21 is provided with a crank arm 27, which extends loosely between the rods 15.

In practice, the lamp 23 is adjusted to any desired angle with relation to the axis of the shaft 21, and the clamps 14 are secured in positions to cause the rods 15 to engage opposite sides of the crank arm 27, so that sidewise movement of said rods will impart rotations to the shaft 21, but up and down movements of said rods will have no effect upon said shaft. In operation, the lateral movement of the connecting rod 13 in either direction, for the purpose of steering the vehicle, causes the rods 15, by reason of their engagement with the crank arm 27, to rotate the shaft 20. Such rotation is always in a direction to project the beam from the lamp laterally toward the side to which the vehicle in turning. This changing of the direction of projection of the beam is brought about by reason of the angular relation of the lamp 23 with respect to the axis of the shaft 21, because any rotation of the shaft will move the lamp bracket 24 out of its vertical position to an inclined position, and this movement not only directs the beam in the direction toward which the vehicle is turning, but also directs said beam slightly upward so that it is projected forwardly a greater distance than it normally would be. As the vehicle again resumes a straight course, the direction of rotation of the shaft 20 is reversed to bring the lamp to its normal straight-ahead position.

The advantages of the invention will be readily apparent to those skilled in the art to which the invention belongs. An important advantage is that by reason of the character of the connection between the connecting bar of the steering mechanism and the crank arm of the dirigible shaft, up and down movement of the connecting rod with respect to the dirigible shaft is permitted, so that vibrations and shocks imparted to the steering gear are not transmitted to the said dirigible shaft or to the lamp carried thereby. Therefore, a steadily projected beam is assured. Another important advantage is that the number of moving parts is reduced to a minimum, and that the change in direction of the projection of the beam is accomplished without the interposition of complicated levers and equalizing devices interposed between the steering mechanism and the lamp.

It is to be understood that although but one lamp and its operating mechanism are illustrated and described, the invention is not limited thereto, because it is obvious that two or more lamps may be employed, it only being necessary to duplicate the dirigible shaft and its supports, and the means for operatively connecting said shaft with the steering mechanism.

Having thus explained the nature of the invention and described an operative manner of constructing and using the same, although without attempting to set forth all of the forms in which it may be made, or all of the forms of its use, what is claimed is:—

1. A dirigible headlight comprising a dirigible shaft, bearings arranged in different horizontal planes so as to rotatably support said shaft in a normally inclined position with its front end higher than its rear end, said rear end having means by which the shaft may be rotated, and a lamp mounted on said front end in a normally fixed angular relation with respect to said shaft.

2. A dirigible headlight comprising a dirigible shaft, means rotatably supporting said shaft in a normally inclined position with its front end higher than its rear end, said rear end being provided with a crank arm positioned to be engaged with the steering mechanism of a motor vehicle, so that rotation of said shaft will be coordinated with the steering of said vehicle, and a lamp mounted on the front end of said shaft.

3. A dirigible headlight comprising a dirigible shaft, means rotatably supporting said shaft in a normally inclined position with its front end higher than its rear end, said shaft having a lamp at its front end and means at its rear end for operatively engaging the steering mechanism of a motor vehicle so that rotation of said shaft will be coordinated with the steering of the vehicle, said steering mechanism engaging means being constructed to permit free vertical movement of said steering mechanism with respect to said shaft.

4. The combination with a motor vehicle of a dirigible shaft, means carried by the vehicle rotatably supporting said shaft in an inclined position with its front end higher than its rear end, said rear end being provided with a crank arm engaged with the steering mechanism of the vehicle so that rotation of the shaft will be coordinated with the steering of the vehicle, and a lamp mounted on the front end of said shaft.

5. In combination with a motor vehicle and the steering mechanism thereof of a bracket attached to said steering mechanism and provided with spaced apart pins, a dirigible shaft, means carried by the vehicle rotatably supporting said shaft in a normally inclined position with its front end higher than its rear end, said rear end being provided with a crank arm interposed between said pins so that operation of the steering mechanism may impart rotation to said shaft, and a lamp mounted on the front end of said shaft.

In testimony whereof I have hereunto set my hand.

HENRY H. MORETON.